United States Patent [19]

Dunnington et al.

[11] 4,032,684
[45] June 28, 1977

[54] LAMINATED BACKING STRUCTURE FOR COMPOSITE LITHOGRAPHIC PLATE

[75] Inventors: Richard Harry Dunnington; Carl Michael Viglianco; Wilkens, George Rudolph, all of Winston-Salem, N.C.

[73] Assignee: RJR Archer, Inc., Winston-Salem, N.C.

[22] Filed: Sept. 10, 1976

[21] Appl. No.: 722,246

[52] U.S. Cl. .............................. 428/332; 428/463; 428/421; 428/513; 428/516; 428/520; 428/522; 101/462; 101/457; 428/475; 428/450; 428/447; 428/452; 428/458; 428/424

[51] Int. Cl.² ................... B32B 27/08; B32B 27/10
[58] Field of Search .......... 428/421, 522, 520, 516, 428/463, 513, 475, 447, 450, 332, 452, 461, 458, 424; 101/462, 457

[56] References Cited

UNITED STATES PATENTS

| 3,016,823 | 1/1962 | Thurlow | 428/447 X |
|---|---|---|---|
| 3,229,628 | 1/1966 | Mundell et al. | 101/462 |
| 3,376,162 | 4/1968 | Spencer et al. | 428/488 X |
| 3,836,494 | 9/1974 | Hekal et al. | 428/461X |
| 3,923,574 | 12/1975 | Vercauteren | 428/474 X |

*Primary Examiner*—P. C. Ives
*Attorney, Agent, or Firm*—Grover M. Myers

[57] ABSTRACT

A method of manufacturing a composite lithographic product for use in medium to long-run printing applications consisting of the steps of providing a sheet of metal of between 0.004 to 0.008 inch thick and having a lithographic quality surface, treating at least one surface of the metal sheet to accept a sensitizing coating, providing a backing sheet and laminating the backing sheet to the untreated surface of the metal sheet.

4 Claims, 2 Drawing Figures

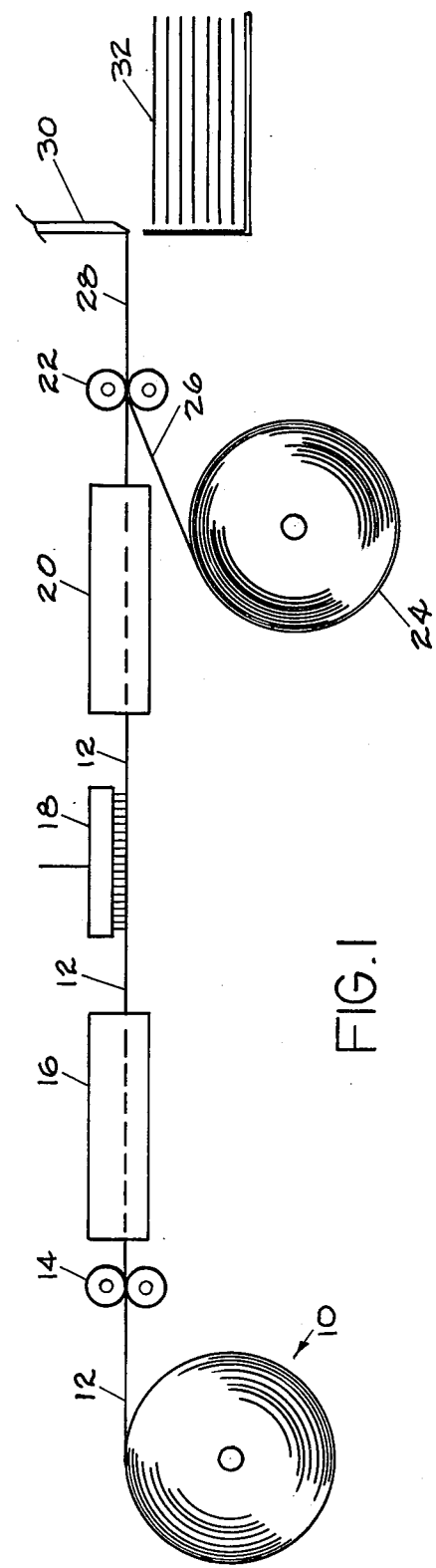
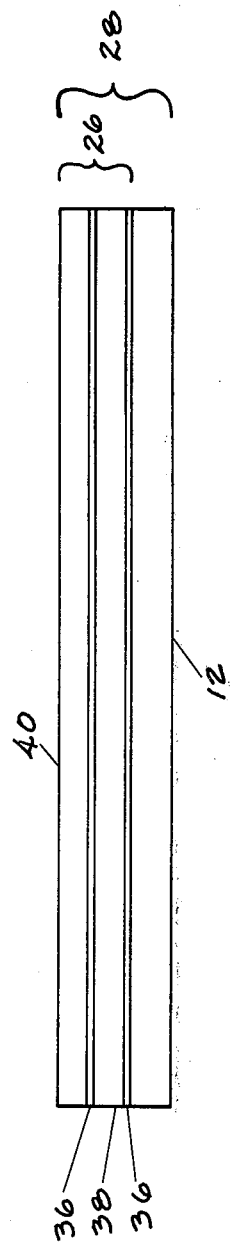
FIG. 1
FIG. 2

LAMINATED BACKING STRUCTURE FOR COMPOSITE LITHOGRAPHIC PLATE

BACKGROUND OF THE INVENTION of the Invention

This invention relates to a method for forming a composite lithographic plate, and, in particular, the invention relates to a method of making a composite lithographic plate which can be utilized with medium to long run printing applications. The invention also relates to a backing structure which can be utilized in forming composite lithographic plate.

In the printing industry, the useable life of a lithographic plate is defined by the number of clear impressions which can be obtained. The life span of a plate is normally divided into three categories — short run, medium run or long run. The short run is usually defined as a plate which will give at least 5,000 to 20,000 clear impressions. The medium run plate will generally give up to about 100,000 clear impressions, while the long run plate will give in excess of 100,000 clear impressions. The short run plates are normally used on the simpler multi-copier machines such as duplicating machines since the short run plates are normally less substantial in strength than the medium or long run plates and their thickness generally has an upper limit of about 0.005 of an inch. The short run plates are usually flexible enough to permit the surface to be prepared by a typewriter.

In view of the requirement for flexibility and in order to save metal, various composite lithographic plates have been developed for a short run application. Two of these lithographic plates are disclosed in the following U.S. Pat. Nos. 2,344,510 and 3,229,628. Most of these plates include a metal layer, usually of aluminum; and, as can be seen in the above-cited patents, the metal layer usually has a thickness of between about 0.0005 to 0.002 of an inch. A paper layer of between 0.0025 and 0.010 of an inch is provided as a backing member. The paper is usually waterproofed in order to withstand the various treatments the plate must be subjected to during processing to prepare its surfce to receive the sensitizing coating.

The treating procedures usually include a degreasing step, a graining step — either chemical or mechanical — and, in some cases, an anodizing or solution bath which prepares the surface of the metal to receive a sensitizing coating. In the degreasing step, the plates are washed to remove any grease or foreign matter on the surface of the metal. The graining step which can be mechanical brushing or chemical etching provides a rough surface which aids in preparing the surface of the metal to receive the sensitizing coating. The anodizing of the metal as well as the solution-rinsing step further prepares the metal for the sensitizing coating. In each of these steps, water or some other liquid is utilized; thus, the plates are constantly being wetted.

As mentioned previously, the thinner plates are primarily used for short run applications and cannot normally be used for the medium to long runs because they tend to stretch during use which causes distortions in the impressions produced. It can be easily understood to overcome this stretching problem in longer run printing applications, a thicker plate must be used. Surface quality of these thicker plates must be more uniformed than the short run plates and this is primarily due to economic reasons. For example, if a defect occurs in a short run plate making it useless, it is much less expensive than the thicker plates and it is discarded without much cost. The thin short run plates require more rolling to get them to an acceptable thickness and defects appear more readily. It is an advantage to having the thicker plates for long run use since the uniformity of the surface can be controlled and maintained more easily. Another characteristic of the long run lithographic plates is the surface flatness. The flatness is necessary to allow proper contact of the plate and the negative during the exposure process. If there are any buckles or waves in the metal plate, it will not lie flat on the vacuum frame of the photo-composing machine or the press cylinder. Therefore, it can be easily understood that a thicker gauge metal will retain its flatness more easily. Fortunately, flatness can be maintained much easier in the thicker gauge metals because the contact rolling which is required when manufacturing a thin gauge stock is not required for the thicker gauges.

In view of the above-defined differences between the characteristics of short and medium to long run plates, it can be easily understood that a composite lithographic plate previously known in the art which is used for a short-run printing application cannot be utilized for the medium to long-run jobs. Furthermore, the industry has not turned to laminated composite plates with thicker gauges primarily because no suitable structure has been found which can withstand the processing (degreasing, graining, anodizing, etc.) which is required without the delamination of the structure. Delamination is not a problem with the thin gauge composite lithographic plate because the thinner layers do not absorb the liquid as readily when the composite plates are being processed. When constructing a thick composite plate for use in medium to long run printing applications, the backing member for the metal must necessarily be thicker than the backing member previously known in the art in order to compensate for the much greater reduction in metal thickness. This increased thickness of the backing member makes it much easier for the liquid used in the processing to be absorbed therein, thus, the delaminating problem is more acute. Another factor which must be taken into consideration when making composite plates for longer run applications is the use of press packing paper shims to properly space and align the plates on the presses. If a composite plate were used, one advantage of such a plate would be to eliminate or minimize the requirement for packing material since the backing member could be any thickness desired. Increasing the thickness of the backing layers to eliminate the packing material would also increase the area absorbing the processing liquids and, thus, add to the delamination problem.

SUMMARY OF THE INVENTION

It is, therefore, an object of this invention to provide a method of manufacturing composite lithographic plates which can be used for medium to long-run printing applications.

Another object of this invention is to provide a process for manufacturing various thickness of a backing material which can be laminated to a single gauge metal sheet to form lithographic plates of varying thicknesses in order to eliminate the requirement of packing material.

Another object of this invention is to provide a process for manufacturing composite lithographic plate in which no interleaving is required to stack the plates on one another.

Another object of this invention is to provide a process for manufacturing composite lithographic plates which have a thickness greater than 0.005 of an inch in which the treatment required to prepare the metal surface for printing can be accomplished without the risk of delamination of the finished lithographic structure.

Still another object of this invention is to provide a backing structure which has a bonding layer to adhere the backing materials to the metal layer and the intermediate layer for providing the thickness to the structure, thereby permitting elimination of the portion of the metal and packing required and an outer interleaving layer which permits the lithographic plate material to be stacked or rolled upon itself without necessity of a separate interleaving sheet.

These and other objects are accomplished by the present invention by a process for manufacturing composite lithographic plates for use in medium to long-run printing applications including the steps of providing a sheet of lithographic grade metal between 0.004 to 0.008 of an inch in thickness, treating one surface of the sheet so that it will accept a sensitizing coating, and laminating a backing material to the opposite surface of the metal sheet to form a composite lithographic plate. The backing material includes a bonding layer, which permits bonding of the backing layer to the metal layer and an intermediate layer which provides the thickness to the backing layer and an integral interleaving layer.

BRIEF DESCRIPTION OF THE DRAWINGS

FIG. 1 is a diagrammatic elevation view of an apparatus which may be used for a continuous process for producing a lithographic plate according to the present invention; and FIG. 2 is an enlarged partial sectional view of a lithographic plate prepared in accordance with the process of the present invention.

DESCRIPTION OF A PREFERRED EMBODIMENT

Referring more particularly to the drawings, the numeral 10 indicates a supply such as a coiled web of metal preferably of aluminum, copper or zinc having surface characteristics capable of being utilized in a medium to long-run lithographic printing application. The surface finish of lithographic grade material is between 5 to 15 RMS (Route Mean Squared) and it has a typical flatness value of less than one-eighth inch and with a frequency of 8 to 12 inches in running length. The flatness value is determined by placing the sheet on a flat surface and measuring the height of any center or edge buckle and the frequency. This metal is to be used to form a composite lithographic plate which will include a metal layer and a backing member structure. The lower thickness limit of the metal is dictated by the surface characteristics of the metal and the ability to maintain litho flatness in the rolling mills which is required for medium to long-run lithographic plates while the upper limit is dictated primarily by cost because the major reason for manufacturing a composite lithographic plate of this type is to reduce costs by reducing the metal required. It should be understood, however, that minimum thickness is the critical limit and, as mentioned above, this is primarily because of the surface finish quality required in medium to long-run printing applications. The metal thickness can be between 0.004 to 0.008 of an inch but a thickness of 0.0055 or 0.0060 of an inch is preferred.

The metal web is unwound from the coil and fed by feed rolls 14 into a degreasing station 16 as is well known in the art. The degreasing station prepares the surface of the metal for further processing. After exiting the degreasing station, the web passes through a graining station 18 where at lest one surface of the web is prepared with a grained finish either by mechanically brushing with a work brush, as illustrated, which is known in the art, or by chemical etching which is also known in the art. When the metal web 12 emerges from the graining station 18, it can be passed through other treating stations which aid in increasing plate life as, for example, an anodizing station 20 and/or a treating step such as a sodium silicate bath. If a solution is used, normally a drying step is also necessary.

The web passes from the anodizing and/or treating station 20 and is directed through heated nip rollers 22. A supply of coiled web 24 of a backing structure 26 is positioned adjacent the treatment line so that the web of backing material can be directed between the heated nip rollers 22. The backing member is a laminated structure with the layer which contacts the metal web 12 being a suitable bonding material which will be tacky when heated by the nip rollers and will adhere to the surface of the metal web 12 upon cooling to form a composite lithographic product or web 28. The temperature of the nip rollers and the pressure and time of application depend on the particular bonding material utilized. A preferred backing structure is defined hereinafter.

In the preferred embodiment, the composite lithographic web 28 then passes through a cutting station 30 where the web is cut into plate 32 of a desired size. However, as will be explained in more detail hereinafter, the outer layer of the backing member is a suitable interleaving material; therefore, if desired, the composite lithographic web can be recoiled on a spool for easy handling and storage instead of being cut into plates.

The structure of the lithographic plate 28 is illustrated in FIG. 2. The two principle elements of the plate 32 are the metal layer 12 formed of a metal adaptable to form a lithographic printing surface and the backing structure or element 26. The metal layer required is generally between 0.004 and 0.008 of an inch thick with the optimum being about 0.0055 with a temper of between −H16 and −H18 which is the normal range for medium to long-run lithographic plates. The roughness value of the surface of the metal web within the above-mentioned range of gauges is between 8 to 15 RMS.

The backing element 26 is multilayer laminate consisting of any combination of normally solid flexible organic polymeric material, i.e., plastic and/or paper having a bonding layer. Generally, the principle layers provided are a bonding layer 36, an intermediate layer of filler material 38 and an interleaving layer 40, each of said layers being bonded to the adjoining layer by techniques known in the art. The bonding layer can be any suitable adhesive capable of bonding to the metal layer 12 under the influence of heat and pressure to form a bond having a typical peel strength of about 4 pounds per inch of width. It has been found that a thermoplastic resin provides good bonding between the metal and the filler material. Because of its seal strength characteristics, the preferred thermoplastic resin is a copolymer of ethylene and acrylic acid, with the acid neutralized with sodium or zinc salt, such resins known as Surlyn ionic copolymers are described in U.S. Pat. No. 3,791,915. One particularly useful resin is known as Surlyn 1652 and is a product of the DuPont Company. It should be understood, however, that other thermoplastic resins can be used as, for example, Gulf's 1018 which is a low density polyethylene. Any thermoplastic organic resin, or mixture of resins, with or without added bonding characteristic enhancing adjuvants, which is known to be bondable to the metal layer 12 may be employed. Those resins known and employed in the art as heat sealable resins may be employed. These polymers include polymers of ethylene, particularly branch polyethylene; as well as copolymers of ethylene with vinyl esters of organic acids, such as vinyl acetate; and copolymers of ethylene with lower acrylate esters, such as methyl methacrylate, methyl acrylate, ethyl acrylate, 2-ethyl hexyl acrylate, methacrylic acid and acrylic acid.

The backing filler 38 can be of any thickness desired but a range of between 0.001 inch and 0.020 inch will be sufficient for most printing applications. The backing filler may be any material which will resist water, ink and grease in order to resist swelling in the backing material to prevent delamination and maintain dimensional stability. Preferably the backing filler is a fluorocarbon treated paper. The fluorocarbon treatments give the paper a water, ink and grease resistance. The fluorocarbon used to treat the paper may be any of the number of fluorocarbons, monomeric or polymeric, which are well known in the art for treating fibrous cellulosics to render them water and grease resistant. Neither the particular fluorine containing compounds nor the manner of their preparation are recited since those skilled in the art of making and/or using such compounds known and have described such materials. As mentioned previously, one advantage of providing a backing structure separately from the metal layer is the flexibility it gives the lithographic plate manufacturer's customers of various thicknesses of lithographic plates. Normally, the metal web provided will be of a single thickness which is dictated by the surface quality characteristics required for lithographic application and the backing material will be supplied in various thicknesses. The plate manufacturer combines the metal layer with a desired thickness of backing per the customer order. This aids the customer because he does not have to be concerned with the paper shims for aligning the plates and it also aids the plate manufacturer by enabling him to maintain only an inventory of various thicknesses of backing material which would be less expensive than maintaining an inventory of different thicknesses of composite plates.

The final layer is an interleaving layer 40 which will permit the plates to be stacked on one another or the composite lithographic web 28 to be recoiled after processing without the necessity of providing separate interleaving material as is customary in the industry. The interleaving layer is chosen to provide an impervious smooth, non-scuffed surface which does not adhere to the surface of the lithographic plate at ambient conditions to prevent damage to the surface of the lithographic plate which it contacts. Any material, including flexible thermoplastic or thermosetting organic polymeric materials which do not become tacky under the conditions utilized to bond the metal to the bonding layer, including polyolefins, polyesters, polyanides, polyurethanes, silicone resins and natural and synthetic elastomers, which has these characteristics can be utilized, but it has been found that a high density polyethylene provided the desired results.

Two examples of backing structures which have been produced and give excellent sealing strength between the metal layer and the backing material are as follows:

STRUCTURE 1

High density polyethylene film
Casein Neoprene adhesive
Fluorocarbon treated paper
Primer
Surlyn 1652

STRUCTURE 2

High density polyethylene film
Low density polyethylene
Primer
Fluorocarbon treated paper
Primer
Surlyn 1652

Any adhesive promoting primer or laminating adhesive which is compatible with the various layers may be utilized, if desired, to enhance bonding between the principle layers, and such primers and laminating adhesives are known to those skilled in the art.

These structures defined above provide a sealed strength between the metal layer and backing structure of between 4.0 to 8.0 pounds per inch of width if the nipping temperature is as low as about 225° F. The sealed strength values mentioned previously were determined on an Instron Tensile Tester known to those skilled in the art.

From the above-description of the preferred embodiment of the backing structure and the composite lithographic plate which is formed by the process of the present invention, it can be easily seen that the present invention provides a method for manufacturing composite lithographic plates for use in medium to long-run printing applications. It also provides a backing structure which can be a varying thicknesses and which has a bonding layer to secure the backing structure to the metal layer, an intermediate filler layer which permits varying the thickness of the plate and an integral interleaving layer to eliminate the necessity of using separate interleaving sheets.

It should be understood that the present invention can be modified in various ways; for example, the changing of the material used in the backing structure, or eliminating one or more or the metal treatment steps; however, such changes will not detract from the true scope of the invention which is defined in the following claims.

We claim:

1. A laminated backing structure for a composite lithographic plate comprising a metal sheet and a backing structure which laminated backing structure comprises:
   a. bonding layer consisting essentially of a thermoplastic resin bondable to the back of a lithographic grade metal sheet under the influence of heat and pressure;
   b. an intermediate filler layer of a normally solid flexible organic polymeric material, which layer is resistant to water, ink and grease to provide a selected thickness to said backing structure;

c. an outer interleaving layer of a thermoplastic or thermosetting organic polymer having a smooth non-suff surface which does not adhere to the metal surface of a metal surfaced lithographic plate under ambient conditions, and which does not become tacky under the conditions necessary to bond the bonding layer (a) to a lithographic metal sheet;

said layers being bonded together to form a coherent laminated structure.

2. The laminated backing structure of claim 1 wherein the bonding layer is an ionomeric salt of a copolymer of ethylene and acrylic acid.

3. The laminated backing structure of claim 1 where the intermediate filler layer is a water, ink and grease resistant fluorocarbon treated paper at least 0.001 inches thick.

4. The backing structure of claim 1 wherein said interleaving layer is polyethylene film.

* * * * *